May 24, 1932. L. C. JOSEPHS, JR 1,859,333
HYDRAULIC STEERING GEAR FOR MOTOR VEHICLES
Filed Feb. 11, 1931
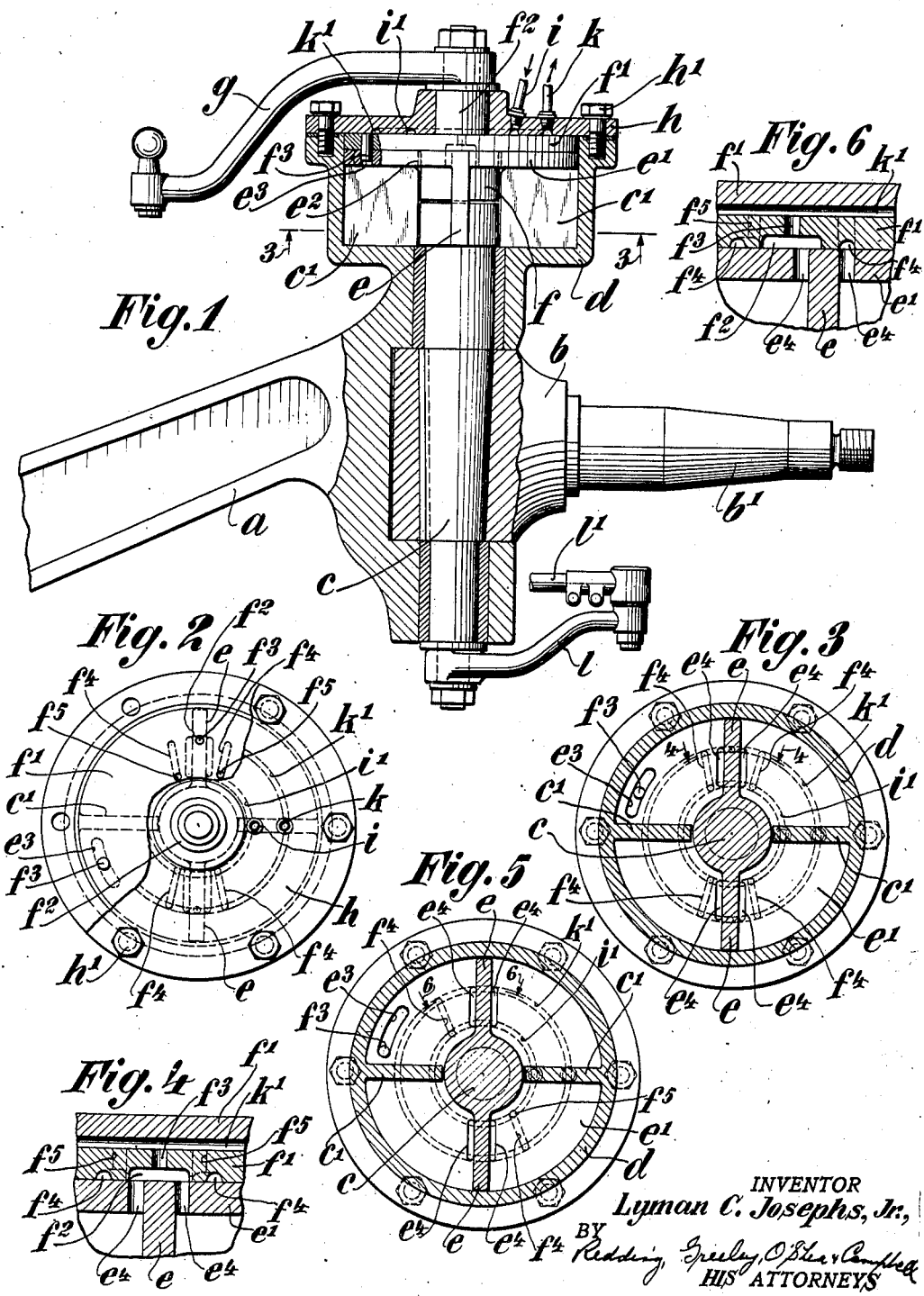
INVENTOR
Lyman C. Josephs, Jr.,
BY
HIS ATTORNEYS Patented May 24, 1932

1,859,333

UNITED STATES PATENT OFFICE

LYMAN C. JOSEPHS, JR., OF ALLENTOWN, PENNSYLVANIA, ASSIGNOR TO INTERNATIONAL MOTOR COMPANY, OF NEW YORK, N. Y., A CORPORATION OF DELAWARE

HYDRAULIC STEERING GEAR FOR MOTOR VEHICLES

Application filed February 11, 1931. Serial No. 515,025.

This invention relates to steering mechanism for vehicles and is concerned particularly with the type in which conventional steering parts are operated by the driver in the usual manner, the effect of such operation being merely the actuation of a valve to control the application of power to the dirigible elements. The improvements are further concerned primarily with the association of power steering mechanism with the conventional steering gear in such manner that failure of the power mechanism will, nevertheless, permit the application of manual steering effort to the dirigible parts in the usual manner. The principal object of the invention is to provide in mechanism having the characteristics set forth above power steering means which are mounted directly on the vehicle axle and so associated with the steering wheel spindles as to impress the power steering effort directly on the knuckles. In accordance with the invention the improved device is thus mounted in proximity to the wheel to make it unnecessary to transmit the steering effort through intermediate linkage. A further object of the invention is to provide power steering devices which are simple in construction, compact in design, inexpensive to manufacture and install and certain in action. These advantages further enable each of the steering wheels to be provided with its own power steering device with the resulting direct application of steering effort.

Still another object of the invention is to provide a power steering device in which the driven element may be in the nature of a rotary piston, such a design lending itself readily to direct association with a vertically disposed knuckle pin or other oscillating part of the steering wheel mounting.

Still a further object of the invention is to provide a plurality of individual hydraulic power steering devices for a plurality of steering wheels and interconnect such wheels through suitable linkage to insure equalization of movement at all times while retaining the capacity for manual steering.

A further object is to provide a simple hydraulic power steering device in which the source of hydraulic power is wholly external to the device thereby permitting the use of either special pumps for the purpose or standard pumps now associated with internal combustion engines.

The invention will be described in greater detail in connection with the embodiment illustrated in the accompanying drawings which show, merely by way of example, one suitable assembly, and in which:

Figure 1 is a view partly in section and partly in elevation of an axle and steering wheel spindle with a hydraulic power steering device embodying the improvements, associated therewith.

Figure 2 is a view in plan of the steering device shown in Figure 1, part of the cover plate being broken away to show the rotary control valve.

Figure 3 is a view in transverse section through the mechanism shown in Figure 1 and taken on the plane indicated by the line 3—3 and looking in the direction of the arrows, the rotary valve being in median position in which power is cut off from the piston.

Figure 4 is a fragmentary view in section taken on the plane indicated by the line 4—4 of Figure 3 and looking in the direction of the arrows and showing the relation of the ports when the power is cut off.

Figure 5 is a view similar to Figure 3 but showing the relation of the ports when the valve is opened to permit the application of power to the rotary piston.

Figure 6 is a fragmentary view in section taken on the plane indicated by the line 6—6 of Figure 5 and looking in the direction of the arrows to show the relation of the ports when power is applied.

The invention is not limited as to the type of axle and steering wheel mounting employed, those illustrated herein being merely by way of example. Where other types of axles and steering wheel parts are employed it will be evident as the description proceeds, to one skilled in the art, as to how the improvements may be adapted to such other forms. The axle $a$ is shown as having mounted therein a knuckle $b$ carrying a wheel spindle $b'$; the knuckle being keyed to a vertically disposed knuckle pin $c$. The axle $a$ has secured thereto or formed integral therewith a cylindrical chamber $d$ which in the illustrated embodiment is disposed above the knuckle $b$. On the inner walls of this chamber are mounted two radially disposed and aligned vanes or partition walls $c'$. Within the chamber $c$ and substantially at right angles to the two vanes $c'$ are mounted radial piston members $e$. These members are secured to the knuckle pin $c$. As shown in the drawings the vanes $e$ are formed integral with and depend from a plate $e'$. This plate is formed with a central aperture $e^2$ through which extends a shaft $f$, the lower end of which is in proximity to the upper end of the pin $c$ when the parts are assembled. The shaft $f$ may be formed integral with a rotary valve disc $f'$ from which extends upwardly a shaft section $f^2$ coaxial with the depending shaft section $f$. The disc $f'$ rests on the plate $e'$. The upper end of the shaft section $f^2$ has secured thereto a steering lever $g$ which may be connected to the conventional hand steering mechanism by any suitable linkage which need not be illustrated. A cover plate $h$ is secured to the chamber $d$ as by means of screws $h'$ enclosing all of the parts and constituting a bearing for the shaft section $f^2$. The depending shaft section $f$ bears between the inner ends of the fixed vanes $c'$ and the inner ends of the piston blades $e$. A supply pipe $i$ for fluid under pressure is secured to the cover plate $h$ and leads the fluid to the chamber. A separate pipe $k$ is similarly mounted on the cover $h$ and permits the return of the same fluid from the interior of the chamber.

While the control and operating mechanism for the improved hydraulic unit may be of any suitable character as will be evident to one skilled in the art, the relationship of the parts shown herein whereby the desired control is effected will now be described. The valve $f'$ may have only a limited rotary movement with respect to the plate $e'$ by reason of a slot and stud connection therebetween, such a connection being afforded by a depending pin $f^3$ carried by the valve member which rides in an arcuate slot $e^3$ in the plate. Normally, the pin $f^3$ is disposed between the ends of the slot $e^3$ so that the valve disc may be moved manually in one direction or the other to a limited extent after which, however, the hydraulic power is applied to the plate $e'$ and the parts thereafter move in unison until continued movement of the valve $f'$ by hand is discontinued, whereupon the plate $e'$ continues to move a limited distance leaving the pin in its original midposition within the slot. The connections for accomplishing this control are dependent, of course, on suitable porting for the purpose. As shown, the inlet pipe $i$ for the fluid discharges into circular groove $i'$ formed on the under-face of the cover. The outlet pipe $k$ likewise communicates with a circular groove $k'$ on the inner face of the cover. The oulet grove $k'$ communicates with two radially disposed grooves $f^2$ formed on the underface of the rotary valve $f'$ and formed diametrically opposite to one another therein. Openings $f^3$ connect the grooves $f^2$ with the groove $k'$. In the plate $e'$ at opposite sides of the piston vanes $e$ are formed ports $e^4$. When the parts are in normal position, at which time power is not applied to the piston vanes, the radial slots $f^2$ bridge the pairs of ports $e^4$, respectively, thereby maintaining open communication between the interior of the chamber $d$ and the outlet pipe $k$. The groove $i'$, with which the inlet pipe $i$ communicates, also communicates with two pairs of radially disposed grooves $f^4$ which are formed on the under-face of the rotary valve $f'$ and are disposed at diametrically opposite sides of the plate. These grooves $f^4$ are at opposite sides of the exhaust grooves $f^2$, respectively. The grooves $f^4$ communicate with the groove $i'$ through openings $f^5$, respectively.

As shown in Figures 3 and 4 when the interior of the chamber is in communication with the exhaust pipe $k$, as is the non-steering condition, the grooves $f^4$ which communicate with the inlet pipe $i$ are blanked off from communication with the ports $e^4$ in the plate $e'$, these grooves at that time being disposed at opposite sides of said ports, respectively. When the valve $f'$ is rotated by hand by actuation of the steering arm $g$ one of the grooves $f^4$ at each side of the rotary valve $f'$ is brought into communication with one of the ports $e^4$, such ports by such movement being blanked off from communication with the outlet pipe $k$, leaving the parts in the positions shown in Figures 5 and 6. Instantly, fluid pressure is applied to each of the piston vanes $e$, such power serving to rotate such vanes with the knuckle pin $c$. Such movement will continue so long as the valve $f'$ is moved by hand but when such movement ceases it will be evident that continued movement of the plate $e'$ with the vanes $e$ will bring all of the ports $e^4$ in communication with the outlet grooves $f^2$ thereby establishing communication between the interior of the chamber and the outlet pipe $k$ and arresting further movement of the parts. The condition will then be such as is illustrated in Figure 4, the inlet connections being blanked off.

The operation described will ensue regardless of the initial direction of rotation of the rotary valve disc $f'$, steering being accomplished in one direction or the other as the operator determines.

In the form of mounting illustrated the lower end of the knuckle pin $c$ may carry an arm $l$ which may be connected by a cross link $l'$ to the knuckle pin on the opposite steering wheel to which duplicate mechanism, as described, may be applied. The purpose of the cross connection is to insure equalization in movement as between the two wheels.

It will be understood that if the power mechanism fails for any reason manual steering may be effected to control the vehicle for safety by reason of the slot and pin engagement between the plate $e'$ and the rotary disc $f'$.

Changes in the type of power generating unit and the control therefor may be made without departing from the relationship of parts necessary to accomplish the particular objects enumerated herein.

What I claim is:

1. In a vehicle, in combination with a steering wheel knuckle and mounting therefor, hydraulic steering mechanism carried on the center line of the knuckle pin and including fixed elements and movable elements, the movable elements being movable with the knuckle and a manually operable valve for the mechanism to control the application of hydraulic pressure to the said movable elements.

2. In a vehicle, in combination with a steering wheel knuckle and supporting axle therefor, a hydraulic steering device carried on the center line of the knuckle pin and including a rotary piston movable with the knuckle, and a manually operable valve incorporated in said device to control the actuation of said piston by hydraulic power.

3. In a vehicle, in combination with a steering wheel knuckle and supporting axle therefor, a hydraulic steering device mounted on the axle and including a cylindrical chamber mounted coaxially with the knuckle pin, fixed and movable radial vanes disposed within said chamber, means to support the movable vanes for movement with the knuckle and a manually operable valve supported within the chamber and controlling the application of hydraulic power to the movable vanes.

4. In a vehicle, in combination with a steering wheel knuckle and supporting axle therefor, a knuckle pin, piston elements carried on the knuckle pin, a hydraulic chamber carried with the axle in which said piston elements are disposed and a manually operable valve carried with said chamber to control the application of hydraulic pressure to said piston elements.

5. In a vehicle, in combination with a steering wheel knuckle and supporting axle, a hydraulic steering device mounted on the axle and including a cylindrical chamber having a plurality of cylinders therein, rotary piston elements mounted within said cylinders, respectively, and connected with the knuckle, and a manually operable rotary valve mounted with said cylinders to control selectively the application of hydraulic power to said pistons.

6. In a vehicle, in combination with a steering wheel knuckle and supporting axle therefor, a hydraulic steering device mounted on the axle in the center line of the knuckle pin and connected operatively with the knuckle and a manually operable valve for controlling the application of hydraulic power to the knuckle including two relatively movable disks having inlet and exhaust ports.

7. In a vehicle, in combination with a steering wheel knuckle and supporting axle therefor, a cylindrical chamber mounted on the axle, a knuckle pin extending into said chamber and having radial vanes movable therein, fixed radial vanes mounted in said chamber, a plate carried with said movable vanes and disposed within said chamber, a disc supported on said plate, manually operable means to oscillate the disc to a limited angle with respect to said plate and inlet and exhaust ports in said plate and disc whereby the application of hydraulic power to said movable vanes may be controlled.

This specification signed this 3rd day of February, A. D. 1931.

LYMAN C. JOSEPHS, JR.